(12) United States Patent
Schafers et al.

(10) Patent No.: US 9,618,044 B2
(45) Date of Patent: Apr. 11, 2017

(54) OUTER RING AND ROLLER BEARING COMPRISING SAID TYPE OF OUTER RING

(71) Applicant: Schaeffler Technologies AG & Co. KG, Herzogenaurach (DE)

(72) Inventors: Heinz Schafers, Erlangen (DE); Stefan Ruppert, Aurachtal (DE); Ekrem Akyol, Forchheim (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/903,776

(22) PCT Filed: Jun. 10, 2014

(86) PCT No.: PCT/DE2014/200252
§ 371 (c)(1),
(2) Date: Jan. 8, 2016

(87) PCT Pub. No.: WO2015/007279
PCT Pub. Date: Jan. 22, 2015

(65) Prior Publication Data
US 2016/0169283 A1  Jun. 16, 2016

(30) Foreign Application Priority Data

Jul. 16, 2013  (DE) .......... 10 2013 213 928

(51) Int. Cl.
*F16C 33/60* (2006.01)
*F16C 33/62* (2006.01)
(Continued)

(52) U.S. Cl.
CPC ............ *F16C 33/60* (2013.01); *F16C 33/588* (2013.01); *F16C 33/62* (2013.01); *F16C 33/64* (2013.01); *Y10T 29/49682* (2015.01)

(58) Field of Classification Search
CPC ...... F16C 25/06; F16C 33/583; F16C 33/588; F16C 33/60; F16C 33/62; F16C 33/64; Y10T 29/49696; Y10T 29/49682
(Continued)

(56) References Cited

U.S. PATENT DOCUMENTS 1,454,682 A * 5/1923 Layne ............... F16C 33/26
                                                    384/301
1,967,821 A   7/1934 Hess
(Continued)

FOREIGN PATENT DOCUMENTS

CA   2075128   8/1996
CH     86248   5/1919
(Continued)

OTHER PUBLICATIONS

Eich Rollenlager GmbH, Hattingen, www.eich-waelzlager.de/index_eich.htm, Basic Bearing Types (Jan. 2012).

*Primary Examiner* — Marcus Charles
(74) *Attorney, Agent, or Firm* — Volpe and Koenig, P.C.

(57) ABSTRACT

An outer ring for a roller bearing includes a raceway produced from a bearing steel. The outer ring is made of a metal strip wound to form a raceway tube and a cladding tube which is connected thereto and which surrounds the raceway tube on the outer side.

16 Claims, 3 Drawing Sheets

(51) Int. Cl.
*F16C 33/64* (2006.01)
*F16C 33/58* (2006.01)

(58) Field of Classification Search
USPC ............. 384/499, 513, 515, 535, 537, 569; 29/898.066, 898.07
See application file for complete search history.

(56) References Cited

U.S. PATENT DOCUMENTS

| | | | |
|---|---|---|---|
| 2,532,327 A | | 12/1950 | Parks |
| 2,667,689 A | * | 2/1954 | Parks ................... F16C 35/077 29/898.07 |
| 2,852,322 A | * | 9/1958 | Reuen .................. F16C 17/026 384/301 |
| 3,304,138 A | | 2/1967 | Sampatacos |
| 3,366,427 A | * | 1/1968 | Silver ................... F16C 17/024 384/103 |
| 3,750,249 A | * | 8/1973 | Brandon ............... F16C 27/063 267/282 |
| 3,881,791 A | * | 5/1975 | Hentschel ............. F16C 17/02 384/125 |
| 4,043,567 A | * | 8/1977 | Kaiser .................. B62D 7/18 280/93.512 |
| 4,509,871 A | * | 4/1985 | Herzog ................. F16C 19/166 384/502 |
| 4,728,088 A | * | 3/1988 | Smith ................... F16C 33/26 251/902 |
| 5,315,892 A | * | 5/1994 | Gabas ................... F16C 1/20 74/500.5 |
| 5,477,717 A | | 12/1995 | Skrebergene et al. |
| 6,524,010 B1 | * | 2/2003 | Derman ................ F16C 19/183 384/513 |
| 7,401,981 B2 | * | 7/2008 | Matheny ............... F16C 35/077 384/513 |
| 2011/0311362 A1 | | 12/2011 | Corts |

FOREIGN PATENT DOCUMENTS

| | | |
|---|---|---|
| DE | 1602446 | 5/1973 |
| DE | 3248634 | 7/1984 |
| DE | 3809906 | 10/1989 |
| DE | 4127213 | 2/1993 |
| DE | 69314118 | 9/1997 |
| DE | 102008024055 | 11/2009 |
| DE | 202010004482 | 11/2010 |
| DE | 102009052350 | 5/2011 |
| GB | 417774 | 10/1934 |
| WO | 2012116735 | 9/2012 |

\* cited by examiner

OUTER RING AND ROLLER BEARING COMPRISING SAID TYPE OF OUTER RING

CROSS REFERENCE TO RELATED APPLICATIONS

This application is a 371 National Stage Application of PCT/DE2014/200252, filed on Jun. 10, 2014, which claims priority to German Application No. 102013213928.4, filed on Jul. 16, 2013, both of which are expressly incorporated by reference herein in their entirety.

FIELD OF THE INVENTION

The invention relates to an outer ring for a roller bearing with a raceway made from a roller bearing steel.

BACKGROUND

Conventional roller bearings, in particular, so-called solid roller bearings, are formed of through-hardened or case-hardened outer rings that are produced from tubular sections, rod sections, or forging blanks through metal-cutting processes, in order to produce the raceway, rim, and recesses. Such roller bearings with thick-wall outer rings are used, e.g., in motor vehicles. Due to the large number of parts, the design of the outer ring is optimized with respect to the load and the production costs.

For high-temperature applications, bearings are used whose rolling bodies are produced by the rolling of a strip on a spindle. The rolled roller bodies compensate for the thermal elongation at high temperatures. Such a bearing is known from DE 38 09 906 A1. In that document, a bearing is proposed that has several rows of rolling bodies of which one row consists of spring rollers. The spring rollers are produced from steel strips that are wound in a helical shape on pins.

The prior art also includes bearing rings that are wound from spring strip steel and can be used as a bearing inner ring or as a bearing outer ring. Such spring sleeves are held in a shaft or in a hole through internal pretensioning and the spring sleeve expands with the adjacent components when subjected to elevated temperatures. These spring sleeves are produced, e.g., by the company Eich Rollenlager GmbH, Hattingen (www.eich-waelzlager.de).

Conventional solid roller bearings have an outer ring that is produced from a material that is suitable for the roller bearing raceway. For the required metal-cutting rough processing, a relatively large percentage of the material is left over as cutting waste that first is complicated to produce and then must be disposed of or recycled in complicated procedures.

The mentioned wound bearing rings are suitable only for high-temperature applications and therefore only have sufficient accuracy for those ranges.

SUMMARY

The invention is based on the object of providing an outer ring for a roller bearing whose production causes less waste and can be produced economically.

To achieve this abject, it is provided according to the invention for an outer ring of the type mentioned above that it is formed of a metal strip that is wound to form a raceway tube and a cladding tube that is connected to this strip and surrounds the raceway tube on the outside.

The invention touches upon the knowledge that an outer ring can be produced in an especially material and resource saving way in that the roller bearing steel needed for the raceway is used only for a raceway tube that is wound around a metal strip, wherein the part of the outer ring not needed for the bearing contact is formed of a cladding tube that is made from a different, more economical material. The raceway tube and the cladding tube are connected to form an integral, one-piece component. Because the raceway tube is wound out of the metal strip, practically no waste is produced by a cutting process, so that the relatively expensive roller bearing steel can be utilized to the best possible degree. The outer ring according to the invention, on the other hand, fulfills all of the requirements that are set for a conventional solid roller bearing, so that a conventional outer ring can be replaced by the outer ring according to the invention.

According to the invention it is especially preferred that the metal strip from which the raceway tube is wound is produced from a roller bearing steel that can be hardened. Advantageously, the metal strip is wound in a spiral shape on a spindle. Suitable materials can be, in particular, C45M or C80M or other suitable roller bearing steels in a strip shape.

With respect to the cladding tube, it is preferred that this is made from a steel that can be welded, in particular, from DC03. Advantageously, the cladding tube is made from a steel strip.

According to a preferred construction of the invention, the cladding tube of the outer ring can be produced by winding the steel strip. Accordingly, both the raceway tube and also the cladding tube can be produced through winding. Accordingly, no cutting processes are required.

For a sufficient steel strip, the cladding tube can be wound around the raceway tube or a raceway tubular section and the ends of the cladding tube are then closed by welding or clinching (joining by shearing and upsetting). Either only the raceway tube or also the cladding tube connected to the raceway tube can be hardened, if necessary, a fine processing step is performed by grinding and/or honing. If only the raceway tube is hardened, the production can be realized with lower energy consumption.

One refinement of the outer ring according to the invention provides that, between the raceway tube and the cladding tube, there is an intermediate layer made from a plastic material, a lacquer, an adhesive, a coating, or a film. Alternatively, an intermediate layer produced by a cladding process can also be provided.

To produce a mechanically stable raceway tube, it can be provided that the metal strip wound to form the raceway tube has parallel side chamfers that contact each other in the wound state with a friction-fit and positive-fit connection. Thus, when wound, a left side chamfer touches the right chamfer after one revolution, whereby the required stability is obtained. Other profile shapes are also usable that connect the windings of the metal strip wound to form the raceway tube to each other and guarantee a sufficient radial support of the metal strip sides.

According to the invention, constructions of the outer ring are also possible in which the cladding tube has rims or rim rings that surround the raceway tube in the radial direction.

In addition, the invention concerns a roller bearing with an outer ring, an inner ring, and rolling bodies that are formed as rollers and are held in-between.

BRIEF DESCRIPTION OF THE DRAWINGS

Embodiments of the invention are shown in the accompanying drawings and are described in more detail below. Shown are.

DETAILED DESCRIPTION OF THE PREFERRED EMBODIMENTS

Figure 1:
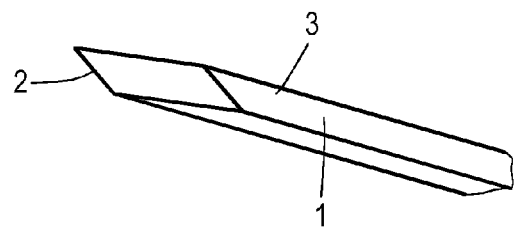
FIG. 1 a metal strip for producing the raceway tube,
FIG. 2 an embodiment of a wound raceway tube,
FIG. 3 a metal strip for producing the cladding tube,
FIG. 4 an embodiment of a wound cladding tube,
FIG. 5 the production of the outer ring
FIG. 6 another embodiment of the production of the outer ring,
FIG. 7 a section view of an outer ring according to the invention, and
FIG. 8 a perspective view of an outer ring with rims.

FIG. 1 shows a metal strip 1 in a perspective view that is used for producing a raceway tube. In the shown embodiment, the metal strip 1 is made from a roller bearing steel of type C80M that can be hardened. The thickness of the metal strip 1 is approx. 1 mm. Depending on the size of the outer ring to be produced, however, a different thickness can be selected. In FIG. 1, it can be seen that the metal strip has, in cross section, the shape of a parallelogram, that is, it has a bottom side parallel to the top side and two inclined sides 2, 3 parallel to each other. In the wound state, the inclined sides 2, 3 contact each other, wherein displacements are avoided. The pitch of the inclined sides 2, 3 and the width of the metal strip 1 are selected so that, in the wound state, for each raceway width, approximately two spiral groove revolutions are generated. This has a positive effect on the running noise. For other constructions, more than two spiral groove revolutions can also be generated.

Figure 2:
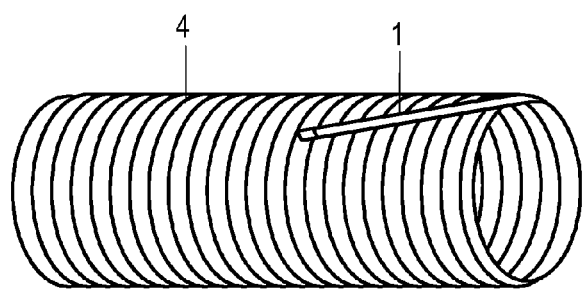

FIG. 2 shows an embodiment of a raceway tube 4 wound from the metal strip 1. The winding of the raceway tube 4 is performed on a winding core that is then removed again.

Through the two-sided inclined sides 2, 3 of the metal strip 1, for the raceway tube 4, a friction-fit connection is produced in the axial direction and a positive-fit connection is produced in the circumferential direction and radial direction. Accordingly, the raceway tube 4 has a large stability. For all of the different production variants, initially the metal strip 1 shown in FIG. 1 is wound to form the raceway tube 4 shown in FIG. 2. Then the raceway tube 4 is surrounded with a cladding tube, for which different production variants are possible.

In the simplest case, the raceway tube 4 can be clad with a three-dimensional body sleeve. This three-dimensional body sleeve could also be made from a metal strip or metal strip sections that is or are narrower or wider than the metal strip 1 used for producing the raceway tube.

Figure 3:
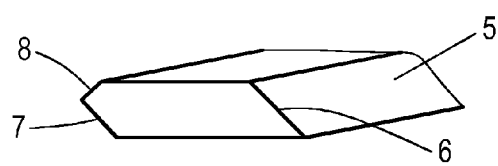

FIG. 3 shows a metal strip 5 that involves a steel strip that can be welded. In the illustrated embodiment, the material DC03 is used for this strip. In this case, the thickness is approximately 2 mm, the width of the metal strip 5 is approx. 1.5 times the width of the metal strip 1 that is used for producing the raceway tube 4. In FIG. 3, it can be seen that the metal strip 5 has, in agreement with the metal strip 1, a parallelogram-like basic shape. Two side surfaces 6, 7 are inclined, wherein a positive-fit connection is produced when the metal strip 5 is wound. The tapered corners 8 form a V-shaped groove that simplifies the welding of the wound metal strip 5, whereby a cladding tube is formed.

Figure 4:
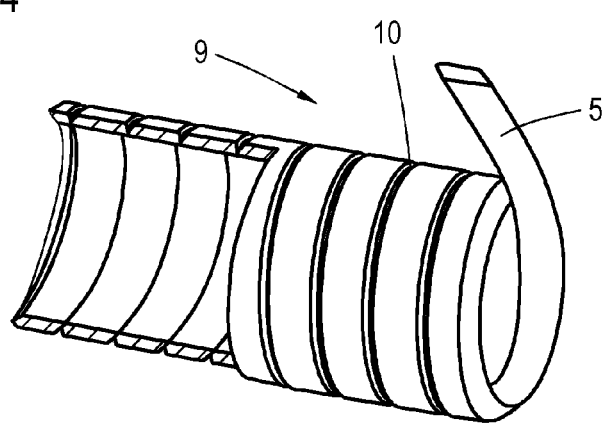

FIG. 4 shows a cladding tube 9 in a partially broken view and perspective illustration. In FIG. 4, it can be seen that a V-shaped groove 10 is formed between adjacent windings of the metal strip 5. The winding of the cladding tube is performed on the raceway tube 4. In FIG. 4, the cladding tube 9 is shown separately only for illustration.

The different variants of production will be explained below.

Figure 5:
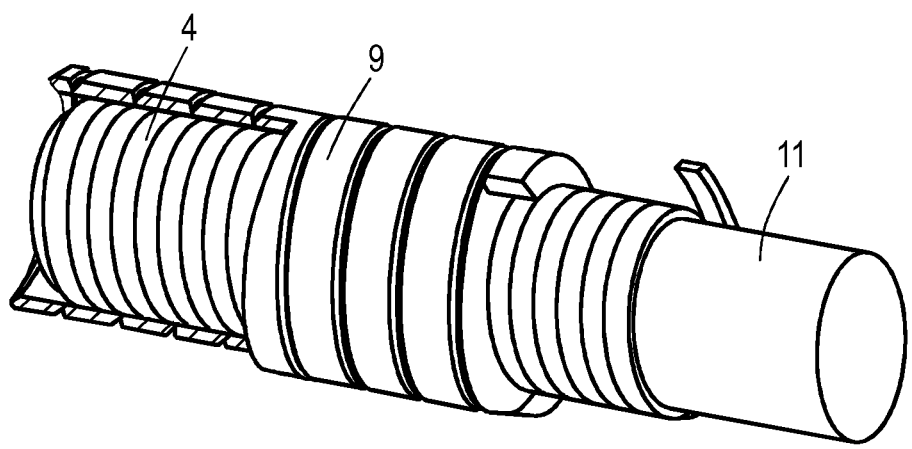

FIG. 5 shows the production of an outer ring, wherein initially the raceway tube 4 is wound on a winding core formed as a tube 11. After the winding of the raceway tube 4, the cladding tube 9 is wound in the same direction on the raceway tube 4 while generating a pre-tensioned state. In the same direction means that the raceway tube 4 and the cladding tube 9 are wound in the same direction of rotation. Then the cladding tube 9 is welded, wherein touching windings of the cladding tube 9 are connected to each other. As the next step, the integrated part consisting of the cladding tube 9 and the raceway tube 4 is removed from the tube 11 acting as the spindle. Individual pieces of the integral outer ring are separated in the desired length. Then a heat treatment is performed through which any existing welding stresses are compensated for. Then a hard machining process is performed. After a hardening process, a fine machining process is performed through grinding and honing in order to guarantee the exact shape and size of the raceway of the raceway tube 4.

Between the raceway tube 4 and the cladding tube 9 there can be temperature-resistant intermediate layers. An intermediate layer can be made from a plastic material, a lacquer, an adhesive, a coating, or an intermediate layer could be produced by a cladding process. It is also conceivable that a surface structure is produced on the contact surface between the raceway tube 4 and the cladding tube 9. By providing an intermediate layer, different advantages are produced, for example, an intermediate layer allows a creep-free connection. In addition, the transmission of vibrations is reduced, so that noise insulation is also produced. Electrical insulation could also be achieved depending on the material that is used for the intermediate layer.

The cladding tube 9 can also be provided with recesses, cut-outs, holes, pockets, or notches. In this way, additional functions, such as fixing a bearing, the provision of lubricant, or the provision of a space for sensors, are possible. Another advantage is the reduction of the component mass.

As an alternative or addition to welding the cladding tube, the cladding tube and raceway tube could also be connected to each other by clinching (joining by shearing and upsetting).

Figure 6:
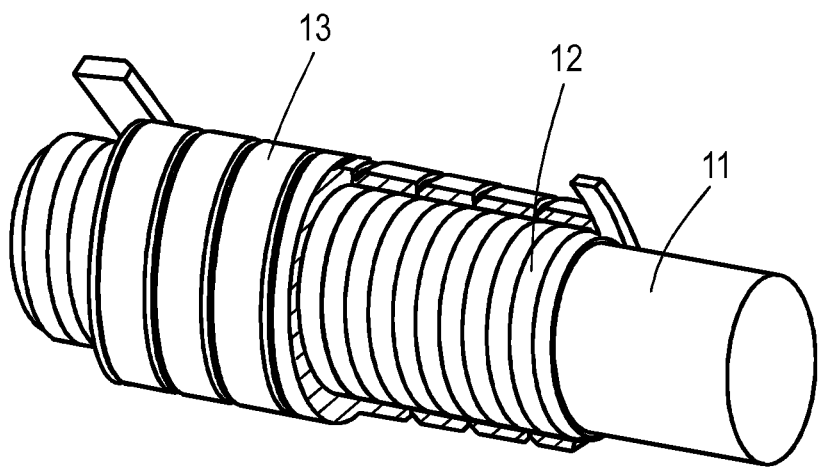

FIG. 6 shows another embodiment of the production of an outer ring in which, different from the embodiment of FIG. 5, an endless tube is not produced, but instead individual tube sections.

Initially a raceway tube 12 is wound onto a winding core made as tube 11. Then a cladding tube 13 is wound on the raceway tube 12 in the opposite direction while generating a pre-tensioned state. The cladding tube 13 is thus wound in the opposite winding direction than the raceway tube 12. In the next step, the cladding tube 13 is welded, that is, the spiral-shaped windings are partially welded to each other. Because the cladding tube 13 has the tapered corner, the welding is performed without a projection relative to the outer diameter of the cladding tube 13. Then a heat treatment is performed, in turn, to reduce any existing weld stress. Then the further processing of the composite tube consisting of the cladding tube 13 and the raceway tube 12 is performed. Through the counter-winding of the cladding tube 13, an advantageous additional axial tensioning is realized.

In another variant of the production of an outer ring, initially a raceway tube is wound onto a winding core. Then a heat treatment of the raceway tube and the winding core (spindle) is performed. Then an intermediate layer is applied. Then the cladding tube is wound on the raceway tube either in the same direction or in the opposite direction while generating a pre-tensioned state. After the welding of the cladding tube, the resulting composite part is removed from the winding core (spindle) and cut to length. Then a hard machining process is performed for the raceway. The advantage of this production plan is that the heat treatment is performed only for the raceway tube, but not for the cladding tube. Accordingly, the production is less intensive in terms of energy. On the other hand, in this production variant, hardened components, namely the hardened raceway tube or its cut-to-length pieces, must be separated.

Figure 7:
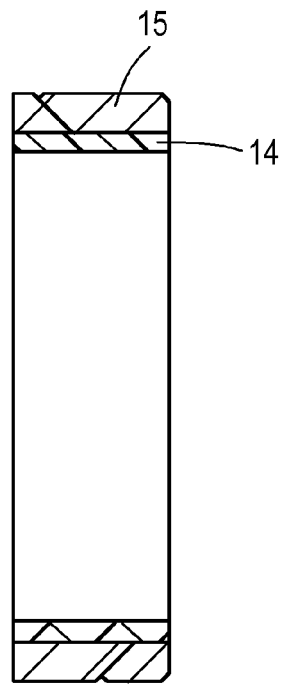

Another alternative production method provides that a raceway tube is wound on the raceway width. Then an inductive heat treatment of this wound raceway tube that is shown in FIG. 7 is performed. After the heat treatment, an intermediate layer can be applied. Then a cladding tube 15 or a cladding sleeve is deposited on the raceway tube 14 while generating a pre-tensioned state. In this variant, both the raceway tube 14 and also the cladding tube 15 are wound in the desired width before the outer ring is formed from the raceway tube 14 and the cladding tube 15. The raceway tube 14 and cladding tube 15 are here connected to each other while generating a pre-tensioned state, then a hard machining process is performed.

Figure 8:
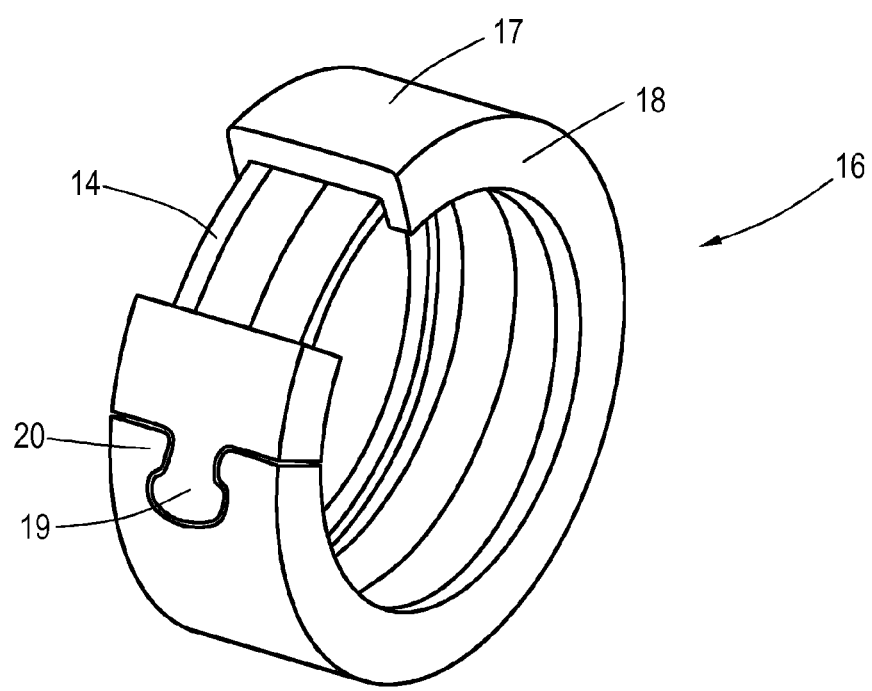

FIG. 8 shows an embodiment of an outer ring 16 consisting of a raceway tube 14 and a cladding tube 17 that has, on its axial sides, a rim 18 that surrounds the raceway tube 14 on the sides. The two ends of the cladding tube 17 bent into a ring are connected to each other by a cap. One end has a mushroom-shaped end section 19 that is inserted into a counter-shaped recess 20 forming an undercut section.

After producing a composite part formed of the cladding tube and raceway tube, the further processing is performed, e.g., on a bar turning machine. The composite tubes including the two components are here fed via bar magazines. The production of the outer rings is realized in this way with practically no waste.

To prevent cuttings during the soft machining process and to achieve economical production without rims, axial guide surfaces for a roller bearing cage are offset outward or into open positions. In this way, a smooth, rim-free raceway is produced. This also produces the advantage that the high purity of the metal strip at the strip surface is used. All of the described production steps can also be performed in different combinations.

Then the outer ring is installed with an inner ring and rolling bodies to form a roller bearing.

List of Reference Numbers
1 Metal strip
2 Side
3 Side
4 Raceway tube
5 Metal strip
6 Side surface
7 Side surface
8 Corner
9 Cladding tube
10 V-shaped groove
11 Tube
12 Raceway tube
13 Cladding tube
14 Raceway tube
15 Cladding tube
16 Outer ring
17 Cladding tube
18 Rim
19 End section
20 Recess

The invention claimed is:

1. An outer ring for a roller bearing, comprising:
a raceway tube comprising a metal strip of roller bearing steel which is spirally wound such that the metal strip is adjacent to itself in an axial direction of the raceway tube; and
a cladding tube that contacts and surrounds the raceway tube on an outer side, the cladding tube comprising a second metal strip which is spirally wound such that the second metal strip is adjacent to itself in an axial direction of the cladding tube.

2. The outer ring according to claim 1, wherein the metal strip is made from the roller bearing steel that is hardenable.

3. The outer ring of claim 2, wherein the roller bearing steel is C45M or C80M.

4. The outer ring according to claim 1, wherein the cladding tube is made from a steel that is weldable.

5. The outer ring of claim 4, wherein the cladding tube steel is DC03.

6. The outer ring according to claim 1, wherein the second metal strip is welded or clinched together.

7. The outer ring according to claim 1, wherein the raceway tube and the cladding tube are spirally wound in a same direction.

8. The outer ring according to claim 1, further comprising an intermediate layer between the raceway tube and the cladding tube, the intermediate layer is made from a plastic material, a lacquer, an adhesive, a coating, a film, or an intermediate layer produced by a cladding process, the intermediate layer has at least one of vibration-damping, electrically insulating, or electrically conductive properties or is usable as a sensor or produces a connection between the raceway tube and the cladding tube.

9. The outer ring according to claim 1, wherein the metal strip that is spirally wound to form the raceway tube has parallel side surfaces that extend at an angle from inner and outer surfaces of the metal strip such that the inner surface is axially offset from the outer surface, and that contact each other in a wound state with at least one of a friction-fit or positive-fit connection.

10. The outer ring according to claim 1, wherein the cladding tube has rims or rim rings that radially surround the raceway tube.

11. A roller bearing comprising an outer ring according to claim 1, an inner ring, and rolling bodies that are held in-between said rings and are formed as rollers.

12. The outer ring of claim 1, wherein the raceway tube and the cladding tube are wound in opposite directions.

13. The outer ring of claim 1, wherein the second metal strip that is spirally wound to form the cladding tube has parallel side surfaces that extend at an angle from inner and outer surfaces of the second metal strip such that the inner surface is axially offset from the outer surface.

14. The outer ring of claim 13, wherein one of the parallel side surfaces includes a tapered corner which forms a V-shaped groove when the second metal strip is spirally wound.

15. The outer ring of claim 14, wherein the second metal strip is welded to itself at the V-shaped groove to form the cladding tube.

16. The outer ring of claim 1, wherein the second metal strip is wider than the metal strip.

* * * * *